Sept. 3, 1963    A. R. CONTI ETAL    3,102,326
CUTTING TOOL
Filed April 20, 1960
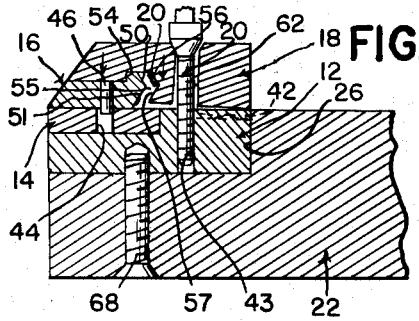
FIG. 2.
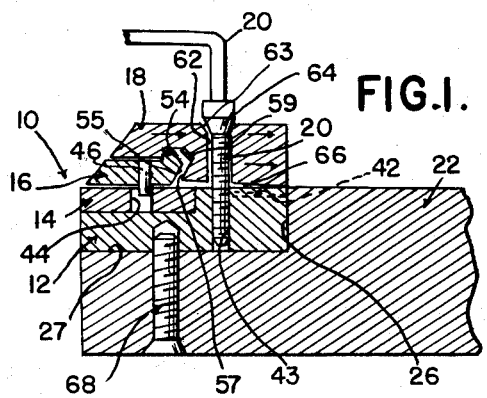
FIG. 1.
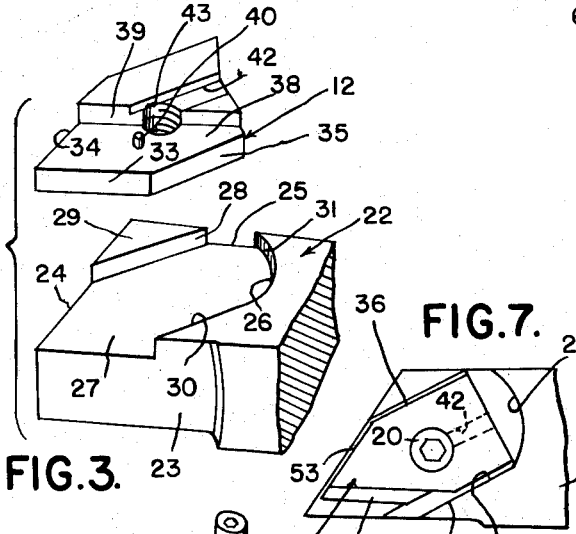
FIG. 3.
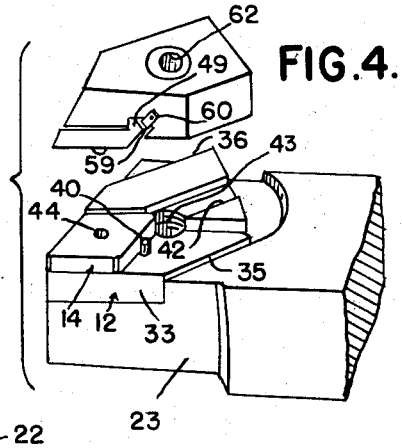
FIG. 4.
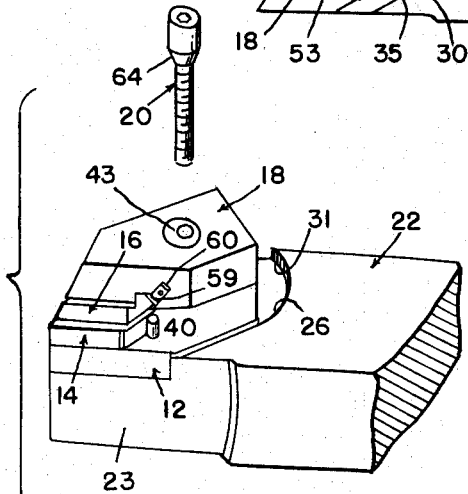
FIG. 5.
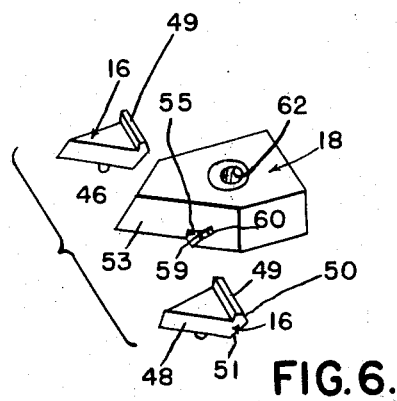
FIG. 7.
FIG. 6.
INVENTORS
ALFRED R. CONTI
DANIEL J. MENTER
BY
ATTORNEYS

United States Patent Office 3,102,326
Patented Sept. 3, 1963

3,102,326
CUTTING TOOL
Alfred R. Conti, 7730 Detroit Blvd., Walled Lake, Mich., and Daniel J. Menter, 3309 Harold St., Saginaw, Mich.
Filed Apr. 20, 1960, Ser. No. 23,514
3 Claims. (Cl. 29—96)

The present invention relates to improvements in a cutting tool of the type comprised of an assembly of a blade or cutting insert, a so-called chip breaker, and a clamp, all mounted upon suitable supporting means including a tool holder of known type. More particularly, the invention concerns an improvement in the manner in which the chip breaker is removably associated with the clamp as a sub-assembly of the tool, in a manner to enable the chip breaker and insert to be easily and expeditiously removed and replaced, if desired. In another aspect, the invention relates to an improved and unitary assembly of clamp, chip breaker and supporting base plate, which assembly is adapted to be interchangeably used on various tool holders.

It is an object of the invention to provide a cutting tool of the type described which is adaptable for use with various types of holder, stationary or rotative. It features a chip breaker which, upon the application of clamping force thereto having vertical and lateral components, is adapted to initially draw a blade or cutting insert engaged by the chip breaker into properly aligned and registered position in respect to the tool holder, or to a base plate by which the unitary assembly is to be fixedly associated with the holder and then to bring the chip breaker vertically into a strong holding engagement with the blade insert. More particularly, the cutting tool comprises a chip breaker which is releasably engaged in a novel and improved manner with the clamp by which it is so engaged with the insert.

In general, it is an object to provide an association of clamp, chip breaker, blade insert and base plate which, as held together by an improved threaded clamping member acting on the clamp, is a unitary association or combination. As such the units may be standardized in regard to the design of blade insert, chip breaker, etc., so that a single unit can be used on various holders, or in various positions on a holder or holders, or so that different types of base plate, blade insert, chip breaker and clamp units may be interchangeably employed on a holder.

It is seen that this expedites the setting up of different sorts of tools, standard or special, reducing cost, inventory and obsolescence and saving set-up time.

A further object is to provide a cutting tool as described, in which the chip breaker is releasably engaged with the clamp in a manner to enable sliding mounting of the chip breaker on and removal from the clamp, as desired, as when a blade insert is being repositioned or replaced, or when the chip breaker itself is to be replaced. More particularly, in accordance with this objective the chip breaker is slidably received in a groove or slot in the bottom of the clamp, which slot is undercut or re-entrant in front to rear cross section through the clamp, so as to retain the chip breaker in association with the clamp when the latter is loosened, as when the blade insert is being repositioned or replaced.

A still further object is to provide a cutting tool of the sort referred to, in which spring means, preferably in the form of a small leaf spring disposed in the slot or groove of the clamp, as referred to above, acts between the clamp and the chip breaker to resist lateral inadvertent or undesired movement of the chip breaker relative to the clamp, thus holding the chip breaker and clamp in association when the latter is loosened or removed from the remainder of the cutting tool structure.

In general, it is an object to provide a cutting tool, preferably featuring automatic and successive positioning and locking action of a clamp and chip breaker on a blade insert, as described, in which a novel, slidably releasable and preferably spring biased connection of the chip breaker to the clamp constitutes the same in effect as a single unit when backed off or released from the tool holder, and in which the chip breaker may be freed from the clamp in a simple lateral indexing action when release from the clamp is desired.

The foregoing as well as other objects will become more apparent as this description proceeds, especially when considered in connection with the accompanying drawing illustrating preferred embodiments of the invention, wherein:

FIG. 1 is a fragmentary view in vertical front to rear section through a cutting tool in accordance with the improvement, being more or less schematic in character, and showing the action of the clamp in an initial phase of positioning and locking a blade insert on a holder;

FIG. 2 is a fragmentary sectional view similar to FIG. 1, showing the relative position of the parts as the clamping action is further carried on toward completion;

FIG. 3 is a fragmentary exploded view in perspective showing a holder and base plate of the tool, these parts, when assembled, in effect constituting a unitary holder device;

FIG. 4 is a fragmentary exploded view showing the base plate and holder, as assembled, and the manner of assembly thereto of the blade insert and the associated chip breaker-clamp device;

FIG. 5 is a similar exploded view of the above described parts as thus far assembled, indicating the application of an actuating screw to complete the unitary, standardized and interchangeable association of parts described above;

FIG. 6 is an exploded perspective view showing the manner in which a chip breaker is releasably associated with the clamp; and FIG. 7 is a fragmentary top plan view of the unitary assembly as mounted on the tool holder.

The improved tool of the invention generally comprises a unitary assembly 10 comprised of a base plate 12, preferably fabricated of heat treated high speed steel, precision ground to accurately receive the other parts of the unit or assembly 10, as well as a cutting blade insert 14, hereinafter further described; a chip breaker 16, a clamp 18 and an Allen type, socket head actuating or clamp screw 20, preferably of heat treated alloy steel. The reference numeral 22 designates a more or less conventional type of tool holder affording a support for the cutting tool unit or assembly 10.

The holder 22 is formed adjacent its forward nose portion with vertical intersecting walls 23, 24, 25, and to provide an upwardly facing recess 26. This recess has a flat bottom surface 27 and is in part laterally defined by an upright wall 28 of a raised abutment 29 at one corner and a parallel upright wall 30 in spaced relation to the wall 28. The recess 26 opens outwardly at the holder walls 23, 24, 25, being formed with a curved wall portion 31 to afford clearance rearwardly of a portion of the tool sub-assembly or unit 10. This is a typical type of holder outline receiving the unit 10, although it may be altered variously in regard to the recessing provisions described above.

The base plate 12 is formed to provide a flat bottom surface to rest on recess surface 27, with intersecting edge walls 33, 34 which are generally upright but may be slightly tapered upwardly and with parallel edge walls 35, 36 which parallel and are adapted to be registered between the respective walls 30, 28 of the recess 26 of holder 22.

The upper surface 38 of base plate 12 is precision ground to receive the blade or cutting insert 14 thereon, and to provide an upright registering wall 39 against which the insert engages and is positioned. To assist in this positioning, plate 12 is provided with a pin 40 projecting upwardly of surface 38, in spaced relation to the wall 39, the insert 14 being drawn rearwardly against said wall and pin into its desired, accurately located position.

Upwardly of wall 39 the base plate 12 is milled to provide a keyway or guideway 42 for a purpose to be described; and in the line of this way the base 12 is drilled and tapped at 43 for the purpose of releasably attaching the remaining parts of the unit 10 thereto and thus constitute the unitary assembly referred to above.

The cutting or blade insert 14 is preferably of tungsten carbide, being in a polygonal outline shown as diamond-shaped, although other polygonal outlines may be adopted, as is well known in the art. The insert 14 is, of course, accurately finished to provide top and bottom surfaces engageable with the surface 38 of base plate 12 and engageable from above by the chip breaker 16. It is also provided with a central vertical hole 44 therethrough for connection with the chip breaker, which urges the insert against the registering pin 40 and wall 39. FIG. 4 of the drawings clearly shows the blade insert 14 as thus registered. In accordance with known practice, the insert is indexable or reversible to extend its life of service.

The chip breaker 16 is, like insert 14, preferably formed of solid tungsten carbide and is equipped with a steel pin 46 depending therebeneath and received in the hole 44 of insert 14. Through the agency of the pin 46, and as actuated by the clamp 18, the insert 14 is first accurately located and registered on base plate 12, after which the chip breaker is located downwardly to lock the insert through the agencies to be described. The forward nose of chip breaker 16 is pointed, its side walls 48 being upwardly relieved or tapered and paralleling corresponding walls of insert 14 and base plate 12; and as best illustrated in FIGS. 1, 2, 4 and 6, the rear portion of the chip breaker, extending between the walls 48, is formed to provide an upstanding wall abutment 49, the forward face of which is linear and vertical. The face of chip breaker 16 rearwardly of abutment 49 is formed to provide a rearwardly and downwardly angling wall portion 50 and a forwardly and downwardly angling wall portion 51.

The clamp 18 is preferably of heat treated oil hardened steel, its pointed nose being defined by upwardly tapering walls 53 paralleling and downwardly merging with those of the chip breaker 16.

Clamp 18 is formed at its bottom to provide a laterally extending slot or groove 55 therein, in which the chip breaker 16 is received at its rear, abutment-bearing portion, the slot 55 being of an outline whereby the chip breaker may first be engaged and drawn rearwardly to its accurately registered position, then clamped in place. To this end, the recess 55 affords an upwardly extending abutment wall 54 engageable with the abutment 49, and a forwardly facing wall conforming in outline with the rear walls 50, 51 of chip breaker 16, including angular wall portions 56 and 57.

It is seen from FIGS. 1, 2, 4 and 6 that the chip breaker 16, once inserted into the undercut or re-entrant slot 51 of the clamp 18, may be slidably withdrawn therefrom, out of engagement with the clamp in the manner best shown in FIG. 6, and may be removed and replaced when desired by a similar sliding action. A small leaf spring 59 acts against the chip breaker to resist mildly such sliding action, being disposed between the upper inclined wall portions 50, 56 of the chip breaker and clamp 18, respectively. At one outer end thereof the spring 59 is offset 90° at 60 to enable it to be fastened to a wall 53 of clamp 18.

Rearwardly of the slot 55, the clamp 18 is formed to provide a bore 62 of greater diameter than the tapped bore 43 of base plate 12, the bore 62 receiving the Allen or like type socket screw 20, in threaded engagement of the latter with base plate 12. The upper edges of the bore 62 are beveled or chamfered at 63, and the screw 20 has a conical formation 64 engageable with this conical bevel 63.

Rearwardly of the bore 62 the bottom of clamp 18 is formed to provide a rearwardly extending key 66 which fits from above in the keyway or guideway 42 of base plate 12, thus stabilizing the clamp in its slight rearward motion when the parts are locked up.

It is seen from the above that, as secured together by the screw 20, the clamp, chip breaker and base plate constitute the unitary assembly 10, with or without the cutting insert 14, so that this assembly is considerably standardized for interchangeable use on various types of tool holder 22, to which the assembly is secured rigidly or releasably, as by a screw 68 extending upwardly of the latter and tapped into the bottom of base plate 12. Furthermore, the clamp 18 and chip breaker 16 are a component sub-assembly, releasably held in place by the spring 59 when out of assembly with the base plate 12. Set up and reset or replacement time are greatly minimized by this arrangement.

The action in the operation of the unit or assembly 10 is best shown in FIGS. 1 and 2, in which the assembly 10 is shown as mounted onto the holder 22. However, it will be appreciated from the above that the action will be the same when the unit is not so mounted.

Referring to FIG. 1, with the insert 14 initially placed upon base plate 12 in engagement between the registry wall 39 and registry pin 40, and with the pin 46 of chip breaker 16 inserted in the hole 44 of the insert, the screw 20 is inserted into the clamp bore 62 and tapped bore 43 of plate 12 and partially threaded into the latter, using an appropriate tool 70. With the key 46 on clamp 18 engaged in keyway 42, the abutment wall 54 of the clamp will be in approximate registry with the abutment 49 of the chip breaker. It is assumed that the chip breaker is positioned in slot 55 in desired side registry with clamp 18.

Upon further screwing of screw 20 downwardly, its conical portion 64 engages rearwardly against the bevel 63 of clamp opening 62, urging the clamp to the rear, as indicated by arrows in FIG. 1, and correspondingly drawing chip breaker 16 to the rear, as well as cutting insert 14, through the agency of the chip breaker pin 46. This firmly engages the insert in registry against wall 39 and pin 40.

Further and final downward threading of screw 20 engages the conical portion 64 of screw 20 forwardly against the bevel or chamfer 63 of bore 62, and finally engages the clamp and chip breaker 16 in locking relation to the accurately located insert 14. It is seen that as the clamp moves in the direction of the arrows in FIG. 1 the compressive force on spring 59 between the clamp 18 and the chip breaker diminishes to reduce stress on the spring when the tool is in use. When the clamp is released the spring 59 automatically resumes pressure on the chip breaker to hold it in sub-assembly with clamp 18.

The drawing and the foregoing specification constitute a description of the improved cutting tool in such full, clear, concise and exact terms as to enable any person skilled in the art to practice the invention, the scope of which is indicated by the appended claims.

What we claim as our invention is:

1. A cutting tool assembly comprising a holder having a cutting insert recess therein, a cutting insert in said recess, a clamp and a chipbreaker overlying said cutting insert and clamping said insert in said recess, said clamp having an undercut slot therein and a spring in said slot, said chipbreaker having a portion slidably received in said slot, said chipbreaker portion being slidably retained in said slot by said spring.

2. A cutting tool assembly comprising a holder having a cutting insert recess therein, a cutting insert in said recess, a clamp and a chipbreaker overlying said cutting insert and normally clamping said insert vertically in said recess under pressure, and means acting between said chipbreaker and clamp and independently of said holder to releasably hold the clamp and chipbreaker in engagement with one another as a unit upon relief of said pressure, said clamp having an undercut recess therein defined in part by a side wall at an angle to the vertical and opening therefrom in a direction transverse of the direction in which said pressure is exerted, said means comprising a formation of said chipbreaker defined in part by a side wall adjacent and paralleling said first named side wall, said formation being releasably and slidably received in said transverse direction in said clamp recess, and means acting in a direction transverse of said side walls to urge said formation against said clamp in the last named direction to resist movement of the chipbreaker in said clamp recess.

3. A cutting tool assembly comprising a holder having a cutting insert recess therein, a cutting insert in said recess, a clamp and a chipbreaker overlying said cutting insert and normally clamping said insert vertically in said recess under pressure, and means acting between said chipbreaker and clamp and independently of said holder to releasably hold the clamp and chipbreaker in engagement with one another as a unit upon relief of said pressure, said clamp having an undercut recess therein defined in part by a side wall at an angle to the vertical and opening therefrom in a direction transverse of the direction in which said pressure is exerted, said means comprising a formation of said chipbreaker defined in part by a side wall adjacent and paralleling said first named side wall, said formation being releasably and slidably received in said transverse direction in said clamp recess, and spring means carried by said clamp and acting in said clamp recess between said side walls to resist movement of the chipbreaker in the clamp recess.

References Cited in the file of this patent

UNITED STATES PATENTS

| | | |
|---|---|---|
| 2,632,536 | Skeel | Mar. 29, 1953 |
| 2,799,079 | Brigner | July 16, 1957 |
| 2,860,402 | Proksa | Nov. 18, 1958 |
| 2,883,737 | Wilson | Apr. 28, 1959 |
| 2,911,707 | Almen | Nov. 10, 1959 |

FOREIGN PATENTS

| | | |
|---|---|---|
| 1,140,048 | France | Feb. 25, 1957 |
| 1,175,280 | France | Nov. 10, 1958 |